United States Patent [19]

Miller et al.

[11] Patent Number: 5,061,923

[45] Date of Patent: Oct. 29, 1991

[54] COMPUTERIZED COMBINATION LOCK

[75] Inventors: James C. Miller, Nicholasville, Ky.; Michael P. Harvey, West Newport Beach, Calif.

[73] Assignee: C & M Technology, Inc., Nicholasville, Ky.

[21] Appl. No.: 250,918

[22] Filed: Sep. 29, 1988

[51] Int. Cl.[5] .......................... H04Q 9/00

[52] U.S. Cl. .......................... 340/825.31; 70/278; 341/35

[58] Field of Search .......................... 340/825.31, 825.32, 340/542, 543; 70/277, 278, 332, 434; 361/172; 310/75 B, 330; 292/144, 201; 341/35

[56] References Cited

U.S. PATENT DOCUMENTS

| | | | |
|---|---|---|---|
| 3,600,643 | 8/1971 | Losey . | |
| 3,812,403 | 5/1974 | Gartner . | |
| 3,835,680 | 9/1974 | Evans | 70/278 |
| 3,878,511 | 4/1975 | Wagner | 340/825.44 |
| 3,950,678 | 4/1976 | Brewer | 361/172 |
| 4,148,092 | 4/1979 | Martin | 70/278 |
| 4,190,785 | 2/1980 | Kompanek | 310/330 |
| 4,433,355 | 2/1984 | Chew et al. | 70/277 |
| 4,477,806 | 10/1984 | Mochida et al. | 340/825.32 |
| 4,479,112 | 10/1984 | Hirsch | 340/825.31 |
| 4,631,940 | 12/1986 | Krivec et al. | 70/332 |
| 4,684,945 | 8/1987 | Sanderford, Jr. | 70/278 |
| 4,912,460 | 3/1990 | Chu | 340/825.56 |

FOREIGN PATENT DOCUMENTS

| | | | |
|---|---|---|---|
| 0021670 | 1/1981 | European Pat. Off. | 340/543 |
| A3208818 | 3/1982 | Fed. Rep. of Germany . | |
| A2533340 | 9/1982 | France . | |
| A2175638 | 12/1986 | United Kingdom . | |
| 8002710 | 12/1980 | World Int. Prop. O. . | |

*Primary Examiner*—Donald J. Yusko
*Assistant Examiner*—Edwin C. Holloway, III
*Attorney, Agent, or Firm*—Lowe, Price, LeBlanc, Becker & Shur

[57] ABSTRACT

A combination lock for a safe or the like is provided that is fully computerized and self powered. A rotary dial is connected to a stepper motor/generator to provide the electrical power to a capacitor to power the system. The stepper motor/generator also provides input signals in the form of a code sequence to a microprocessor that processes the signals to initiate the operation of a drive motor to release a lock bolt once the proper combination is dialed. A read only memory (ROM) determines the proper combination from a combination storage means and feeds the combination to the microprocessor for comparison to the inputted signals from the dial. As each combination dialing sequence is begun, a random code initiator provides a different starting position in the sequence so that electronic or visual surveillance equipment cannot be used to surreptitiously obtain the combination. In order to thwart computerized input dialing to open the lock assembly, a dial speed sensitive lockout device also controls the microprocessor. During the combination dialing, a display unit presents the code and direction of movement of the sequence for observation by the person dialing the combination.

27 Claims, 1 Drawing Sheet

Fig. 1
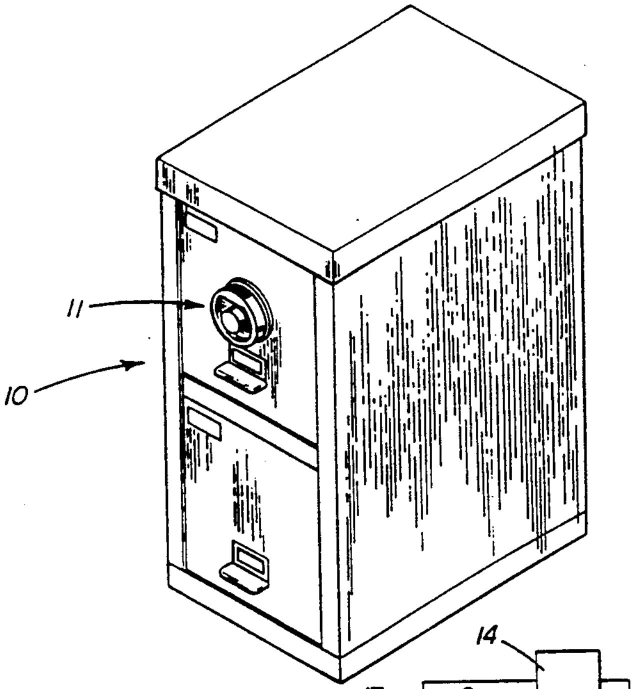
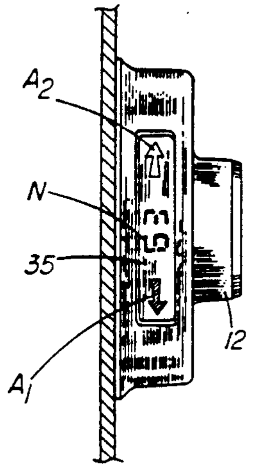
Fig. 2
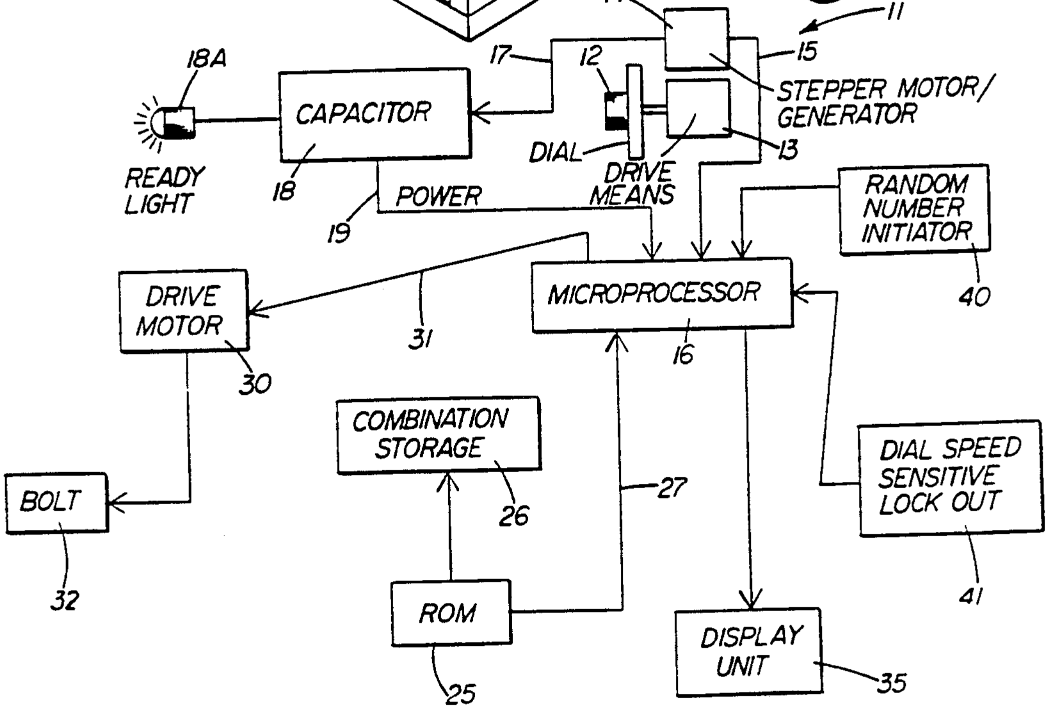
Fig. 3

COMPUTERIZED COMBINATION LOCK

BACKGROUND OF THE INVENTION

The present invention relates to combination locks, and more particularly, to a computerized combination lock that is fully self contained.

The technology of combination locks has changed very little over the past several decades. The basic design of such a lock includes a dial connected to a plurality of tumbler wheels for rotation. If the proper sequence of turning the dial is carried out by the operator, the gates in the tumbler wheels are aligned allowing the lever to drop in position for movement of the operating cam and bolt. Over the years, this type of lock has been improved several times and yet retains the same basic mechanism and function of the original combination locks.

A typical combination lock includes 50–75 machined parts of fairly close tolerance. The lock mechanism is thus relatively expensive, both in terms of material and labor to provide assembly and inspection. Furthermore, since the device is strictly mechanical, the parts are prone to wear and have a fairly high incidence of malfunction requiring repair by a locksmith. Also, with recent advances in listening devices and manipulators, these mechanical combination locks are now more subject to unauthorized opening. The mechanical structure of the lock inevitably provides metal-to-metal engagement sounds that can be recognized by the sophisticated listening devices that are available. Also, this traditional combination lock is susceptible to other types of electronic and visual surveillance to determine the combination.

Thus, it is apparent that a new type of combination lock is desirable to replace the traditional combination lock and overcome the shortcomings of the prior art. A combination lock that is electronic rather than mechanical, and that can provide the protection against unauthorized opening is believed to be the best approach.

SUMMARY OF THE INVENTION

Accordingly, it is a primary object of the present invention to provide a combination lock that is fully computerized and avoids the problems of the prior art mechanical combination lock, as outlined above.

Another object of the present invention is to provide an electronic combination lock assembly that is self powered so as to be completely self contained.

It is still another object of the present invention to provide the self powered electronic combination lock that has a rotary dial similar to a traditional combination lock in order to provide ease of operation and is interchangeable with these prior locks.

It is still another object of the present invention to provide a computerized combination lock assembly that is competitive in cost to manufacture in quantity with its mechanical counterpart, and is also rugged in design and highly reliable in operation.

It is still another object of the present invention to provide a computerized combination lock having a stepper motor/generator to provide the code sequence signals, as well as the electrical power for energizing the lock.

Still another object of the present invention is to provide a lock that starts the dialing operation at a different location in the sequence each time and provides a lock out in the event that excessive speed is utilized in attempting to operate it.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objectives, and in accordance with the purposes of the present invention, a computerized combination lock assembly for a safe or the like is provided that is fully self contained. The lock assembly includes a stepper motor/generator combination operated by a rotary dial to provide pulsed input signals in the form of a code sequence, as well as to provide the electrical power for the lock. Electrical power is stored in a capacitor to power a computer means, preferably a programmable microprocessor, that controls the functions of the system. A traditional rotary dial is used to rotate the stepper motor/generator and thus provides an easy transition for personnel required to operate the lock assembly.

The code sequence signals are processed and compared to a proper combination provided to the microprocessor by a read only memory (ROM), that is in turn responsive to a combination storage means. The ROM feeds the combination to the microprocessor for comparison to the inputted signals from the stepper motor/generator. An electrical operating means, such as a solenoid and reciprocal bolt, is activated in response to the computer means upon receiving the proper code sequence signals.

Following these basic concepts, a lock that is competitive in cost, adapted for direct retrofit on existing safes or the like, and very reliable in operation can be manufactured. There is no need for an outside power source, or for batteries that are prone to run down. The lock assembly is in readiness for use even after long periods of inactivity that are common in safe operations. There are no mechanical parts to provide telltale signals and the need for maintenance is virtually eliminated.

In accordance with another important feature of the present invention, the dialing of a code sequence is initiated from a different starting point each time. This eliminates a security problem by insuring that electronic or visual surveillance of operation of the safe in order to obtain the combination is eliminated. No longer can an unauthorized person position the rotary dial at a known point and rely on the dial being started in the dialing sequence from that number in order to learn the combination. In the present invention, the random code initiation means picks a different point in the sequence each time the lock is powered. Thus, the dialing sequence is varied each time the lock is operated.

As an additional security feature, the lock of the present invention is provided with means for interrupting the operation of the computer means in order to disable the lock under another condition indicating an attempt to gain unauthorized entry to the safe. Specifically, a component of the circuitry is provided to sense the speed of operation of the rotary dial during combination dialing and to interrupt the operation of the computer means when the speed is in excess of typical manual operation. This allows the lock to remain secure from opening when using computerized dialers or manipulation devices.

An electronic digital display is provided integral with the lock dial. The display provides an indication of the number or other code that is presently represented by the position of the dial. In addition, the display means provides a direction arrow for indicating the present sequential direction of dialing by the operator.

In operation, the stepper motor/generator is initially dialed rapidly by hand in either direction to generate electricity and store the electricity in a capacitor. A lock ready monitor in the form of an arrow, for example, is activated when sufficient power is available. Then the dial is turned starting from a random number for dialing the combination at a normal speed to duplicate the known code sequence and activate the lock operating means. If the combination dialing is too fast, indicating an attempt to open the lock by a manipulator device, the computer means locks out preventing opening of the safe.

The computer means is preferably a programmable microprocessor, such as the Intel 80C51. This microprocessor can be powered without difficulty by the stepper generator/motor and is capable of performing all functions mentioned. If desired, in order to obtain an enhanced output from the generator, a gear train can be interposed as part of the drive means between the input dial and the stepper motor/generator, thus providing additional speed and generating capacity. If desired, the gear train may be activated during the initial dialing action to generate the power and deactivated during the actual dialing operation. As an example, a 6:1 enhancement ratio can be provided; thus, the generating speed compared to the dialing speed is increased 6 times.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serve to explain the principles of the invention. In the drawings:

FIG. 1 is a perspective view of a safe upon which a combination lock of the present invention has been applied;

FIG. 2 is a top view of the dial of the lock shown on the safe of FIG. 1; and FIG. 3 is a schematic diagram illustrating the computerized lock assembly with the electronic circuit shown in block form.

Reference will now be made in detail to the present preferred embodiment of the invention, an example of which is illustrated in the accompanying drawing.

DETAILED DESCRIPTION OF THE INVENTION

Reference is now made to FIG. 1 of the drawings showing a typical locking container, such as a locking safe or file cabinet 10 with a computerized combination lock assembly 11 shown on the top drawer. The lock assembly comprises a dial 12 on the outside of the safe, as well as the electronic circuitry on the inside, not shown in FIG. 1 but shown schematically in FIG. 3.

As will be apparent, the dial 12 is operated by a rotary movement, and is connected through a suitable drive means 13 to a stepper motor/generator 14. In accordance with the preferred embodiment of the invention, the stepper motor/generator 14 may be miniature version, Type 17PS-C007-10 manufactured by Minebea Company, Ltd. of Singapore. It is to be understood that other motor/generators including a custom made unit can be used as a substitute for this particular model and if desired, a gear enhancer (not shown) can be provided as a part of the drive means 13. The purpose of increasing the speed of the motor/generator 14 is to increase the power output during the operation for generating electrical power for operation of the electronic circuitry. This would preferably take the form of a typical gear train having alternate relatively large gears driving relatively small gears and providing a gear ratio of approximately 6:1 or more.

It is important to note that in accordance with an important aspect of the present invention that the stepper motor/generator provides two functions simultaneously that are a key part of the operation of the lock assembly 11. First, the stepper motor provides signal pulses that generate a code sequence in response to the rotary motion of the dial 12. These pulses are fed over line 15 to the central computer means of the circuit; namely, microprocessor 16. At the same time, the motor/generator 14 serves as the power means for generating electricity for feeding along line 17 to charge capacitor 18. In turn, the microprocessor 16 is activated by stored power from the capacitor 18 by connection along line 19. A lock ready monitor **18*a* senses the available power stored in the capacitor 18 and when sufficient to operate the lock assembly 11** signals the operator.

The microprocessor 16 is preferably a solid state programmable device; namely, an 80C51 chip manufactured by Intel Corporation of Santa Clara, Calif. This microprocessor chip is particularly suited for relatively low power operation, and for combining the several desirable features of the lock assembly 11 of the present invention. However, it is to be understood that other microprocessors or a custom made chip can be utilized in accordance with the broad aspects of the present invention. It is only necessary that the computing capacity and power requirements be suitable for carrying out the functions as described with respect to the lock assembly 11.

In order to provide the microprocessor 16 with a selected combination for comparison to the code sequence signal from the stepper motor/generator 14, a read only memory 25 is provided. The combination is retrieved from combination storage 26, preferably an electrically erasable programmable chip, Model 93C46 of International Cmos Technology, Inc. of San Jose, Calif. The signal depicting the proper combination is fed to the microprocessor along line 27 during each computing operation. By comparing the combination from the storage 26 with the code sequence from the stepper motor/generator 14, the microprocessor 16 can determine when the requirements for opening the safe have been met.

In order to actually carry out the command for operating the lock assembly 11, a drive motor 30 is provided to be activated-in response to the signal along line 31. Preferably, the drive motor 30 is of the electromagnetic type, such as a rotary or linear solenoid. The operating means also includes a slide bolt 32 activated by the drive motor 30.

A display unit 35 activated by the microprocessor 16 is physically mounted in the stationary rim of the dial 12 (see FIGS. 2 and 3). A suitable choice is the Model HD4700. digital display of Hitachi Corporation, Japan. In the preferred embodiment shown, the code is provided by numbers, as represented by the number N displayed in FIG. 2 (note numeral "63" as shown). In addition, directional arrows $A_1$, $A_2$, are provided to indicate to the operator the direction of movement of the sequence upon rotation of the dial 12. As shown in FIG. 2, the arrow $A_1$ is activated pointing to the left (as oriented in FIG. 1) thus indicating a declining sequential movement of the numerals. This arrangement is particularly advantageous in allowing operators who are familiar with operating a traditional combination lock to feel comfortable in operating the computerized combination lock of the present invention and to substantially reduce the training time for the operators.

Each time the lock assembly 11 is to be operated for combination dialing, it is desirable that the number N that first appears on the display unit 35 is a random number. It has been discovered that if this is done, the chances of successful electronic or visual surveillance to surreptitiously obtain the combination are substantially reduced. In other words, if a different starting position is used in the sequence each time the dial 12 is operated to input the combination, this changes the overall sequence and prevents surveillance from successfully deciphering the combination of the lock assembly 11. Accordingly, a random number or code initiator 40 is provided for connection to the microprocessor 16 to select a different number each time the dial 12 starts a new combination dialing operation. In other words, for one dialing operation, the first number that appears in the sequence might be the number 63, as shown in FIG. 2; whereas, the next time a dialing operation is initiated, the number may be 36, or any other number built into the system. If desired for greater security a random number may be selected each time the dial direction changes during the combination dialing.

In order to further thwart unauthorized opening of the lock assembly 11, a lock out unit 41 that is dial speed sensitive is provided. In the event that the dial 12 is operated at a speed greater than would be required to work a combination in approximately 10 seconds, which is the limit for normal manual input, then the microprocessor 16 is locked out or interrupted so that the operating means 30, 31 becomes inoperative. This assures that the lock assembly 11 cannot be operated by manipulation devices that are computer controlled simply rotating the dial 12 rapidly through all possible combinations, and thus gain unauthorized entry to the safe 10.

Both the code initiator 40 and the lock out unit 41 may be software operated, and all of the electronics can be incorporated into the single custom made microprocessor, if desired.

In summary, the results and advantages of the lock assembly 11 of the present invention can now be more fully realized. The manual input through the dial 12 provides both the code sequence for opening as well as the power to activate the electronic circuitry. This desirable result comes from using the combined functions of the single stepper motor/generator 14. The microprocessor 16 obtains the desired combination from the ROM 25 and compares it to the dialed code sequence, and when a match is made, the drive motor 30 is actuated to effect opening the safe 10 or the like. A display unit 35 provides the numerals N with the directional arrows $A_1$, $A_2$ to indicate either descending or ascending sequence movement. The random number initiator 40 provides for a different number to start the dialing sequence or each time there is a change in direction of the dial. A dial speed sensitive lock out units 41 interrupts the opening process if a speed of operation greater than normal manual speed is detected.

It will also be recognized that in addition to the superior performance of the lock assembly 11, the construction is such as to significantly reduce the cost of manufacture as compared to the traditional mechanical lock. Also, since mechanical components are virtually eliminated, the need for maintenance is substantially reduced.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A computerized combination lock assembly for a secured enclosure, comprising:

input means operable in accordance with a manually entered code sequence;

means for providing code sequence signals in response to manual operation of said manual input means;

a memory for storing data signals representing a predetermined code sequence;

a computer for comparing said code sequence signals with data signals stored in said memory;

operating means responsive to said computer for enabling opening of said secured enclosure when said code sequence signals correspond to said predetermined code sequence;

means for sensing a rate at which a code sequence is entered through said manual input means; and means including said computer for inhibiting said operating means when the rate sensed by said sensing means exceeds a predetermined rate corresponding to a manual entry.

2. The assembly of claim 1, wherein said manual input means includes a rotary dial whose rotary position corresponds to a manually entered code value.

3. The assembly of claim 2, including an electronic digital display integral with said dial.

4. The assembly of claim 1, wherein said memory includes an electrically erasable read only memory for storing said predetermined code sequence.

5. The assembly of claim 1, including random code initiation means for supplying to said computer means a random different origin as a reference for starting said code sequence to be compared with said predetermined code sequence during movement of said manual input means.

6. The assembly of claim 1, wherein said computer comprises a microprocessor.

7. A computerized combination lock assembly for a secured enclosure, comprising:

- a dial rotatable in accordance with a manually entered code sequence;
- means for providing code sequence signals in response to rotation of said dial;
- a memory storing data signals representing a predetermined code sequence;
- a computer for comparing said code sequence signals with data signals stored in said memory;
- random code initiation means for supplying to said computer means at a particular time a random different dial origin as a reference position, independent of a rotational orientation of said dial at said particular time, for starting said code sequence to be compared with said predetermined code sequence during rotation of said dial input means; and
- operating means responsive to said computer for enabling opening of said secured enclosure when said code sequence signals correspond to said predetermined code sequence.

8. The assembly of claim 7, wherein said memory includes an electrically erasable read only memory for storing codes of said predetermined code sequence.

9. The assembly of claim 7, including means for sensing a rate at which a code sequence is entered through said rotary dial; and

- means including said computer for preventing access to said enclosure when said rate sensed by said sensing means exceeds a predetermined rate.

10. The assembly of claim 7, including an electronic digital display integral with said dial.

11. The assembly of claim 7, wherein said computer comprises a microprocessor.

12. The assembly of claim 7, wherein said random code initiation means is responsive to an initial rotation of said dial.

13. The assembly of claim 7, wherein said random code initiation means is responsive to a change of direction of rotation of said dial.

14. A computerized combination lock assembly for a secured enclosure, comprising:

- manual input means movable in accordance with a manually entered code sequence;
- an electricity generator mechanically coupled to said manual input means for converting movement of said manual input means to an operating power;
- a stepper motor integral with said generator for providing code sequence signals in response to manual movement of said manual input means;
- a memory for storing data signals representing a predetermined code sequence;
- a computer energized by said operating power converted by said generator and comparing said code sequence signals with data signals stored in said memory; and
- operating means responsive to said computer for enabling opening of said secured enclosure when said code sequence signals correspond to said predetermined code sequence.

15. A computerized combination lock assembly for a secured enclosure, comprising:

- a dial rotatable in accordance with a manually entered code sequence;
- means for providing code sequence signals in response to rotation of said dial;
- a memory storing data signals representing a predetermined code sequence;
- a computer for comparing said code sequence signals with data signals stored in said memory;
- random code initiation means for supplying to said computer means a different dial origin as a reference position for starting said code sequence to be compared with said predetermined code sequence during rotation of said dial input means;
- operating means responsive to said computer for enabling opening of said secured enclosure when said code sequence signals correspond to said predetermined code sequence; and
- wherein said random code initiation means is responsive to a change of direction of rotation of said dial.

16. A computerized combination lock assembly for a secured enclosure, comprising:

- a memory for storing data signals representing a predetermined code sequence;
- dial means manually rotatable throughout variable limits of rotational travel executed by an operator to define a code entry signal at each of said limits;
- a computer for comparing code entry signals with said data signals stored in said memory;
- operating means responsive to said computer for enabling opening of said secured enclosure when said code entry signals correspond to said predetermined code sequence; and
- power conversion means fixedly coupled to said dial means for converting rotation of said dial to an operating power and for supplying said operating power to said computer.

17. The assembly of claim 16, including means for sensing a rate at which a code sequence is entered through said dial, and means including said computer for preventing access to said enclosure when said rate sensed by said sensing means exceeds a predetermined rate.

18. The assembly of claim 16, including an electronic digital display integral with said dial.

19. The assembly of claim 16, wherein said computer comprises a microprocessor.

20. The assembly of claim 16, wherein said power conversion means further supplies to said computer incremental pulses during rotation of said dial means.

21. The assembly of claim 16, wherein said power conversion means comprises an electromagnetic generator.

22. The assembly of claim 21, wherein said electromagnetic generator further comprises a stepper motor/-generator.

23. The assembly of claim 16, wherein said operating means is activated by power supplied by said power conversion means.

24. A computerized combination lock assembly for a secured enclosure, comprising:

a manually rotatable dial for providing code signals;

power conversion means for converting rotation of said dial to an operating power;

means activated by power converted by said power conversion means for electronically displaying dial indicia corresponding to dial position;

a memory for storing data signals representing a predetermined code sequence;

whereby limits of rotation of the dial corresponding to displayed dial indicia may be set by an operator during manual entry of a code sequence;

a computer activated by power converted by said power conversion means and comparing said code signals provided by said dial at said limits of rotation with data signals stored in said memory; and operating means responsive to said computer for enabling opening of said secured enclosure when said code sequence entered by said operator corresponds to said predetermined code sequence.

25. A computerized combination lock assembly for a secured enclosure, comprising:

a dial manually rotatable bidirectionally for providing code signals;

power conversion means for converting rotation of said dial to an operating power;

means for displaying dial indicia corresponding to dial position;

a memory for storing data signals representing a predetermined code sequence;

whereby limits of rotation of the dial corresponding to displayed dial indicia may be set by an operator upon bidirectional rotation of said dial during manual entry of a code sequence;

a computer activated by power converted by said power conversion means and comparing said code signals provided by said dial at said limits of rotation with data signals stored in said memory; and operating means responsive to said computer for enabling opening of said secured enclosure when said code sequence entered by said operator corresponds to said predetermined code sequence.

26. A computerized combination lock assembly for a secured enclosure, comprising:

a manually rotatable dial for providing code sequence signals having values corresponding to rotational positions of said dial;

indicia corresponding to rotational position of said dial;

power conversion means for converting rotation of said dial to an operating power;

a memory for storing data signals representing a predetermined code sequence;

a computer for comparing code entry signals with data signals stored in said memory;

said computer receiving operating power from said power conversion means during rotation of said dial to predefined limits of rotation, corresponding to said indicia, to provide said code entry signals; and operating means responsive to said computer for enabling opening of said secured enclosure when said code entry signals correspond to said predetermined code sequence.

27. The assembly of claim 26, wherein said operating means is activated by power supplied by said power conversion means.

* * * * *